United States Patent [19]
Maloney

[11] Patent Number: 5,931,140
[45] Date of Patent: Aug. 3, 1999

[54] INTERNAL COMBUSTION ENGINE THERMAL STATE MODEL

[75] Inventor: Peter James Maloney, Dearborn, Mich.

[73] Assignee: General Motors Corporation, Detroit, Mich.

[21] Appl. No.: 08/862,074

[22] Filed: May 22, 1997

[51] Int. Cl.[6] ..................................................... F02D 45/00
[52] U.S. Cl. .............. 123/480; 123/568.22; 123/568.31; 701/103; 73/204.11; 73/118.2
[58] Field of Search ............................... 123/480, 568.11, 123/568.16, 568.22, 568.31; 73/202.5, 204.11, 204.13, 118.2, 118.1, 117.3; 701/101, 103, 108

[56] References Cited

U.S. PATENT DOCUMENTS

| | | | |
|---|---|---|---|
| 4,060,065 | 11/1977 | Hata et al. | 123/568.22 |
| 5,086,745 | 2/1992 | Nishimura et al. | 701/108 |
| 5,103,791 | 4/1992 | Tomisawa | 123/480 |
| 5,209,212 | 5/1993 | Viess et al. | 123/568.22 |
| 5,270,935 | 12/1993 | Duket et al. | 701/103 |
| 5,303,168 | 4/1994 | Cullen et al. | 701/108 |
| 5,576,487 | 11/1996 | Gimson | 73/204.11 |
| 5,610,844 | 3/1997 | Maus et al. | 701/103 |

OTHER PUBLICATIONS

SAE Paper No. 970030 "A Model for EGR Mass Flow Rate Estimation", Azzoni et al, Detroit, MI Feb. 24–27, 1997, (pp. 47–53).

*Primary Examiner*—Willis R. Wolfe
*Assistant Examiner*—Hieu T. Vo
*Attorney, Agent, or Firm*—Michael J. Bridges; Vincent A. Cichosz

[57] ABSTRACT

An internal combustion engine system is reticulated into an exhaustive network of interdependent temperature nodes and heat transfer branches for estimating thermal states at various nodes as required in engine control and diagnostic operations. All material heat transfer processes of each node of interest in engine control and diagnostics are modeled with additional nodes and their respective heat transfer processes added as necessary for a comprehensive analysis of all thermal dependencies, resulting in a precise, generic, portable thermal model for each relevant engine system temperature node.

9 Claims, 4 Drawing Sheets

INTERNAL COMBUSTION ENGINE THERMAL STATE MODEL

TECHNICAL FIELD

This invention relates to internal combustion engine controls and diagnostics and, more particularly, to internal combustion engine thermal state estimation.

BACKGROUND OF THE INVENTION

Internal combustion engine control strategies for precisely controlling engine intake air and injected fuel to balance the goals of low emissions, high fuel economy, and high engine performance are generally known. Significant effort has been made to estimate the mass flow rate of air into an engine cylinder during a cylinder intake event so that an appropriate mass of relatively controllable fuel may be combined therewith pursuant to the engine control strategy, for example to provide a stoichiometric air/fuel ratio within the cylinder during a cylinder combustion event, supporting efficient catalytic treatment of cylinder combustion products. The mass of air flowing into an engine cylinder is dependent on air density and therefore on air temperature. Accurate recirculated engine exhaust gas (EGR gas) mass flow information is required for accurate control of engine fueling and for high performance engine emissions control. EGR mass flow is dependent on EGR gas temperature. Accurate estimation of the temperature of air entering a cylinder, for example through a cylinder intake runner and accurate estimation of EGR gas temperature would therefore be desirable. Direct sampling of air temperature, for example in the area of cylinder intake runners has been proposed. However, conventional temperature transducer durability is unacceptably low in the harsh cylinder intake inner environment. Furthermore, temperature transducers, such as thermocouples, typically lack the transient response characteristics needed to accurately represent the temperature of the turbulent air mass passing through the intake runner to the cylinder during a transient.

Accordingly, cylinder inlet air temperature is estimated. For example, temperature transducers are commonly positioned well upstream, along the normal direction of airflow through an engine system, of cylinder intake runners, such as in the area of intake air filter assemblies, for transducing "upstream" air temperature into a transducer output signal. Temperature transducers are further positioned within an engine coolant circulation path for transducing coolant temperature into an output signal indicating engine block temperature. A calibration procedure may then be carried out in which actual cylinder inlet air mass temperature is measured at various given upstream inlet air and coolant temperature settings, with the measurements stored in the form of lookup tables and indexed by the corresponding upstream air temperature and coolant temperature values. Cylinder inlet air mass temperature may then be referenced and applied to correct an estimate of cylinder inlet air mass determined, for example, as a calibrated function of sensed engine speed and sensed intake manifold absolute pressure (MAP).

Such inlet air mass temperature calibration procedures can be time-consuming and the stored lookup tables can typically consume considerable memory space. While the stored temperature estimates may correspond to cylinder inlet air temperature when operating conditions substantially match those under which the calibration was carried out, a significant estimation error may be introduced when operating conditions deviate from calibration conditions. To account for operating condition deviations, additional calibration may be carried out under various operating conditions, adding significantly to development lead time and to memory requirements. Unless all deviations are accounted for through such additional calibration procedures, significant estimation error can remain, leading to cylinder air/fuel ratio error and increased emissions, reduced performance or reduced fuel economy. In the unlikely event all such operating condition deviations are accounted for, the calibration will be limited to a specific engine application and cannot, without considerable re-calibration time and expense, be extended for use in other engine applications.

It would therefore further be desirable to accurately estimate cylinder inlet air mass temperature over a wide range of engine operating conditions in a manner that can be readily applied across a range of engine applications, to reduce engine control design lead time and expense.

Relatively expensive air meters have been applied for transducing mass flow rate of inlet air upstream of an engine intake plenum (or manifold) into a mass airflow signal MAF which accounts for air density variation with temperature. Under certain limited conditions, such as steady state conditions characterized by substantially no intake manifold filling or depletion, air meters may be used to indicate cylinder inlet air mass. However, any air flow disruption between the air meter and cylinder intake runners under transient conditions will inject considerable error into an air meter-based estimate of cylinder inlet air mass. It would therefore be desirable to accurately determine cylinder inlet air mass under a wide variety of operating conditions including transient conditions while avoiding the expense associated with conventional air meters. It would further be desirable to provide for diagnosis of undesirable temperature conditions throughout an engine system to facilitate treatment of any system fault condition that may increase engine emissions, or that may reduce engine system fuel economy or performance.

SUMMARY OF THE INVENTION

The present invention is directed to a desirable thermal model of an engine system providing accurate temperature estimation of gasses flowing through an engine system for application in engine control and diagnostics. The model is generic to an engine system, making it readily adaptable to various engine system architectures.

More specifically, a flow path of gasses passing through a generic engine system, including fresh air gasses, fuel vapor, and inert gasses, is reticulated into a flow network of interacting temperature nodes and heat transfer branches and the heat transfer at each heat transfer branch modeled and integrated into an exhaustive network in which temperature at each node may be accurately modeled and applied in engine control and diagnostics, for example to correct an estimation of cylinder inlet air density.

In accord with yet a further aspect of this invention, the accurate, exhaustive temperature information yielded across the flow network is applied for diagnosing the operability of various components within an engine system, whereby estimated temperature at various nodes that exceed temperature thresholds corresponding to normal operation of engine system components indicate fault conditions that may be indicated for timely treatment, for example to minimize any corresponding increase in emissions, or reduction in performance or fuel economy.

The reticulated heat-flow network may be readily applied between engine systems and readily accounts for changes in certain components or systems within an engine system, whereby only the temperature nodes or heat transfer branches that are directly impacted by the change in engine systems or components must be re-calibrated while the remaining temperature nodes and heat transfer branches may be ported to a next application intact.

BRIEF DESCRIPTION OF THE DRAWINGS

The invention may be best understood by reference to the preferred embodiment and to the drawings in which.

DESCRIPTION OF THE PREFERRED EMBODIMENT

Pending U.S. patent applications Ser. Nos. 08/759,276 and 08/759,277, assigned to the assignee of this application, are hereby incorporated herein by reference.

Figure 1:
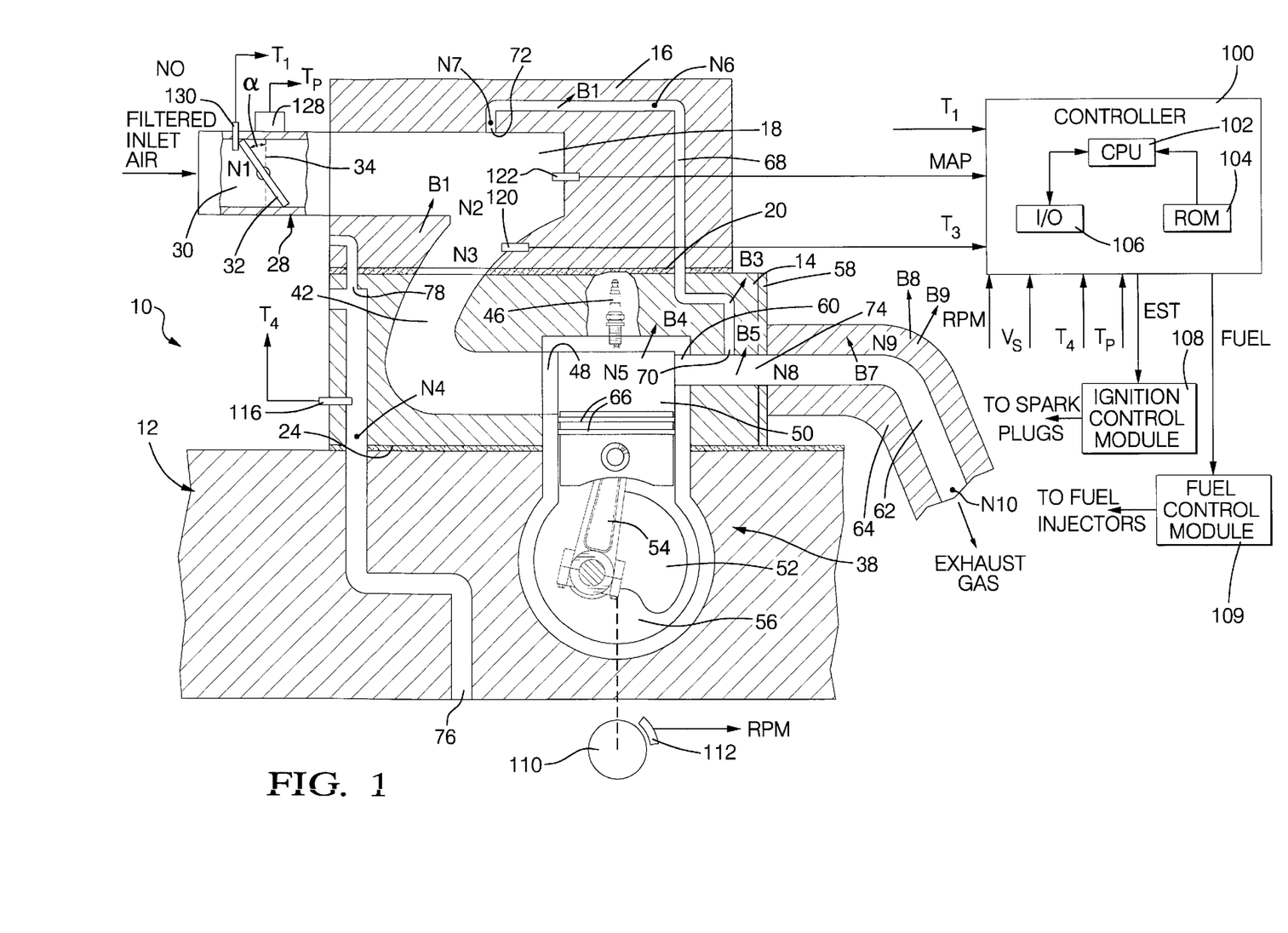
FIG. 1 is a general schematic diagram of an engine system including airflow heat transfer paths and temperature nodes for reticulation in accordance with this invention.

Referring to FIG. 1, an internal engine system 10 is schematically illustrated in which filtered inlet air is drawn into an intake bore 30 of a conventional throttle body 28 in which is rotatably disposed an intake air valve 32 of the butterfly or rotary type (a throttling element) which is manually or electronically rotated by an angular displacement α away from a rest position 34. The rest position 34 substantially completely restricts passage of inlet air through the intake bore 30. A conventional angular position transducer 126 of the potentiometric type includes a wiper arm that rotates with the intake air valve 32 to vary electrical resistance between its output terminals forming signal TP indicating displacement angle α. Signal TP is output to a controller 100 of the conventional single-chip type having such well-known elements as a central processing unit CPU 102, non-volatile memory devices including read only memory devices (ROM) 104 and input/output circuitry I/O 106. A conventional temperature sensor 130 is disposed in the inlet air path in proximity to a conventional air cleaner assembly (not shown) and upstream of the intake air valve 32 for transducing inlet air temperature into an output signal T1.

Inlet air passing the intake air valve is received into an air passage 18 within an intake manifold 16, to which the throttle body 28 is bolted, with conventional gasket 26 therebetween. A conventional pressure transducer 122 is positioned within the passage 18 to transduce air pressure therein into output signal MAP indicating manifold absolute pressure. The air passage 18 opens into at least one runner (also referred to as an intake runner), such as runner 42 within a cylinder head 14 bolted to the intake manifold 16, with conventional gasket 20 disposed between the cylinder head and intake manifold. The runner 42 guides the inlet air to valved ports of at least one corresponding engine cylinder, such as representative valved port 48 of a corresponding cylinder 38 which is machined into an engine block 12 to which the cylinder head 14 is bolted, with a conventional gasket 24 disposed between the engine block 12 and the cylinder head 14.

The throttle body 28 and cylinder head are constructed of any suitable conventional material, such as aluminum in this embodiment. The intake manifold 16 is constructed of any suitable conventional material, such as engineering plastic in this embodiment as is generally known in the art. The engine block 12 is constructed of any suitable conventional material, such as cast-iron in this embodiment. The inlet air is guided across the valved port 48 during a cylinder intake event and into a combustion chamber, such as combustion chamber 44 of cylinder 38.

Inlet air is combined with an injected fuel quantity forming an air/fuel mixture which is ignited in the combustion chamber 44 via an ignition arc driven across the spaced electrodes of a spark plug 46 disposed within the combustion chamber 44. The injected fuel quantity is controlled through a fuel command FUEL generated by the controller 100 and issued, through the I/O unit 106 to a fuel control module 109 which generates a fuel pulse width command signal in response to the command FUEL. The fuel pulse width command signal is selectively applied to fuel injectors (not shown), as is generally understood in the art. The cylinder ignition event is controlled by a signal EST issued periodically by the controller 100 through its I/O unit 106 to an ignition control module 108 for issuing a timed ignition drive signal to the spark plug 46. Mean effective cylinder combustion pressure drives a piston 50 within the cylinder 38 and linked to a crankshaft 52 via rod 54 to reciprocate within the cylinder 38 for rotating the crankshaft, which is mechanically linked to driven automotive vehicle wheels (not shown). A toothed wheel 110 is mechanically linked to the crankshaft 52 to rotate therewith in proximity to a sensor 112 of the Hall effect, magnetoresistive, or variable reluctance type which transduces disruption in its magnetic field caused by passage of the teeth (or notches) about the wheel 110 by the sensor 112 into variations in its output signal which, during rotation of the crankshaft 52, takes the form of a periodic signal having a frequency proportional to crankshaft rotation and engine speed. The output signal of the sensor 112 is provided to the controller 100.

Combustion gas products are exhausted from the combustion chamber 44 through a valved exhaust port 60 and into an exhaust runner 74 within the cylinder head 14 to an exhaust passage 62 within an exhaust manifold 64 including a downpipe element through which the combustion gas products are guided to a catalytic treatment device (not shown) such as a catalytic converter, for catalytic treatment therein, as is generally understood in the art. The exhaust manifold 64 is secured to the engine block 12 in any suitable conventional manner with a conventional gasket 58 disposed therebetween. The downpipe element (not individually shown) of the exhaust passage 62 takes the form of a length of steel tube extending outward from the exhaust manifold 64 in a downward direction toward an inlet of the catalytic treatment device (not shown). The downpipe is illustrated in an integrated manner with the exhaust passage 62 and exhaust manifold 64 for brevity. A valved exhaust gas recirculation (EGR) conduit 68 opens on a first end 70 into the exhaust runner 74 and on a second end 72, opposing the first end, into the intake passage 18 within the intake manifold 16 for drawing, under the vacuum created within the intake passage 18 during engine system 10 operation, a portion of the exhaust gasses passing through the exhaust runner 74 through the conduit 68 for mixing with inlet air passing through the intake passage 18.

An electronically controlled valve (not shown) may be provided within the conduit 68 in proximity to the gasket 20 for varying restriction of the conduit 68 to exhaust gas passing therethrough in response to engine system operating conditions in a manner generally understood in the art to reduce the engine system exhaust gas component of oxides of nitrogen (NOx) by reducing combustion temperature and reducing the oxygen content of a cylinder inlet air charge. A length of the EGR conduit 68 may be disposed within the cylinder head 14 and a length of the EGR conduit 68 may be disposed within the intake manifold 16. In an alternative embodiment within the scope of this invention, the EGR conduit takes the form of a tube element external to the cylinder head 14 and external to the intake manifold so as to be exposed to ambient air at temperature T1. Engine coolant is circulated throughout a network of coolant circulation passages, generally represented as passage 76, in both the engine block 12 and the cylinder head 14, and further including a network of passages within the intake manifold 16, represented as passage 78. The network of passages may further include passages (not shown) within the throttle body 28. A temperature sensor 116 of any suitable conventional type is positioned to be exposed to coolant passing through the network of passages for transducing the temperature of the coolant into an output signal T4 provided to the controller 100. A vehicle speed signal is generated in any suitable conventional manner, such as through conventional undriven wheel speed sensing, and applied as signal Vs to controller 100. A conventional temperature transducer (not shown), such as a thermistor or thermocouple may be provided in an embodiment of this invention in position to be exposed to ambient air outside the throttle body 28 for transducing ambient air temperature outside an engine compartment (not shown) into signal TO which is input to the controller 100. The controller carries out a number of control, diagnostics, and maintenance operations including operations to model thermal processes in the engine system 10 to provide for accurate working temperature information from minimum number of sensors with ease of calibration and portability in accordance with this invention.

Inlet air passing into the engine system 10 of FIG. 1 passes through a network of gas passages reticulated, in this embodiment, into a network of temperature nodes with significant heat transfer processes occurring at various heat transfer branches along the network. The engine system temperature model of this embodiment provides for precise modeling of the change in temperature of gasses passing along the temperature nodes via heat transfer processes at the heat transfer branches so that precise modeling of fluid properties may be provided for engine control and diagnostic operations. The temperature nodes include an external node N0 in the ambient air surrounding the engine system 10 outside the engine compartment (not shown), a first engine system node N1 in proximity to an air cleaner assembly of any conventional type (not shown) and upstream of the inlet air valve 32, a next node N2 within the inlet air passage 18 of the intake manifold 16, node N3 at an outlet portion of the inlet air passage 18 at which portion the inlet air passes into cylinder runner 42, node N4 within a passage 76 of the engine coolant circulation network, node N5 within the combustion chamber 44 of the engine cylinder 38, node N6 within EGR conduit 68 downstream (along the normal direction of flow of exhaust gasses within the conduit) of the EGR valve (not shown) which, in this embodiment, is positioned in proximity to the gasket 20, node N7 substantially at the second end 72 of the EGR conduit 68 at which exhaust gasses are exiting the EGR conduit 68 and entering the intake passage 18, node N8 at an exhaust runner 74 between the valved cylinder exhaust port 60 and the passage 62 through the exhaust manifold 64, node N9 within the exhaust manifold 64, and node N10 at an outlet portion of the passage 62 through the exhaust manifold 64 from which engine cylinder exhaust gasses exit the engine system 10 and enter, in this embodiment, a catalytic treatment device inlet (not shown).

The heat transfer branches include branch B1 from the intake manifold 16 to the inlet air passing through passage 18 thereof, branch B2 between nodes N6 and N7 and from the EGR conduit 68 to the intake manifold 16, branch B3 from the EGR conduit 68 to the cylinder head 14 and between the first end 70 of the EGR conduit 68 and the node N6, branch B4 from a cylinder combustion chamber, such as the combustion chamber 44 of representative cylinder 38, to the cylinder head 14, branch B5 from the exhaust runner 74, between the exhaust port 60 and the node N8, to the cylinder head 14, branch B7 from the passage 62 between nodes N8 and N10 to the exhaust manifold 64, radiation heat transfer branch B8 from the exhaust manifold 64 to surrounding air through a radiation heat transfer process, and convection heat transfer branch B9 from the exhaust manifold 64 to surrounding air through a convection heat transfer process.

The comprehensive thermal state model in accordance with this invention models the relevant heat transfer processes across a complete generic engine system, for example at the described heat transfer branches B1–B9 of FIG. 1 of this embodiment, for accurately modeling temperature at relevant interdependent points across a complete generic engine system, such as at nodes N0–N10 of FIG. 1 with minimized calibration burden and maximum portability between engine systems incorporating various engine components.

Generally, the engine system 10 is modeled as a network of heat exchanger tube elements, a temperature source element (engine cylinder or cylinders), and a thermal capacitance element (the downpipe element of the exhaust manifold 64) which is modeled as having characteristics analogous to a capacitor in an electric circuit. The heat transfer processes of each such element is then modeled through application of empirical data thereto and the interdependency of the heat transfer processes, as well as the dependency of the temperature nodes thereon modeled to arrive at accurate estimation of temperature at the nodes N0–N10. Any component variation or any variation in any control process within the engine system 10 is then readily locally accommodated by adjusting the heat transfer branch or temperature node model corresponding to that component or process, leaving other developed heat transfer and temperature node models within the engine system 10 intact.

The specific models for typical elements within a reticulated generic engine system are now presented, followed by an application of such models to the specific engine system of FIG. 1. The models include a heat exchanger tube element model, a thermal capacitance element model, a temperature source element model, a mixing (first-law or energy conservation) element model, an external convection heat transfer element model, an external radiation heat transfer element model, and a throttling element model.

Figure 2:
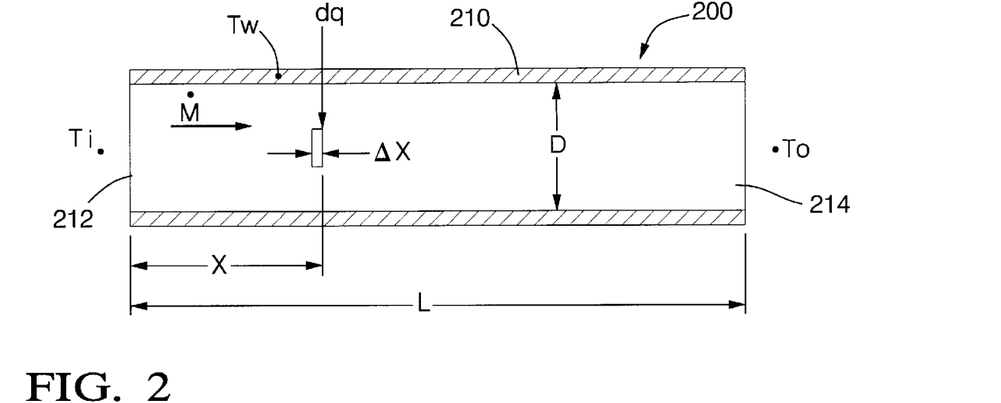
FIG. 2 is a schematic diagram of a heat exchanger tube element for modeling heat-transfer processes of the engine system of FIG. 1.

Referring to FIG. 2, a heat exchanger tube element model describes the change in temperature of a gas having a specific heat cp passing through a substantially constant surface tube 200 of length L as the gas transfers heat to the tube wall 210, as follows:

$$\frac{dT(x)}{dx} = \frac{\pi D}{\dot{m} \cdot cp} \bar{h}(Tw - T(x)) \tag{1}$$

in which x is gas displacement along the length of the tube 200, T(.) is a gas temperature function, $\bar{h}$ is the average convection coefficient at the inner wall boundary layer, and Tw is the tube wall 210 temperature. Equation (1) is derived from conventional heat transfer laws. To determine gas temperature To at the tube exit 214, equation (1) is integrated with respect to x for x=L, yielding:

$$To = Tw - (Tw - Ti)e^{-\left(\frac{\pi DL}{\dot{m} \cdot cp}\bar{h}\right)} \tag{2}$$

in which Ti is the gas temperature at the inlet 212 to the tube 200.

Equation (2) relates tube outlet temperature To to tube inlet temperature Ti under steady state gas mass flow conditions. In the heat exchanger tube element model, the effect of transport delay times across the tube element 200 on temperature were considered to be negligible. For both laminar and turbulent gas flow conditions through the tube element 200, the convection coefficient $\bar{h}$ is a function of the generally understood Reynolds number and Prandtl number, and of the tube dimensions and gas thermal conductivity. The Reynolds number is a function of gas mass flow and viscosity. The Prandtl number is an insubstantial function of gas temperature and pressure. Neglecting the insubstantial dependency of gas temperature and pressure on gas viscosity, Prandtl number and gas thermal conductivity, $\bar{h}$ may therefore be expressed as a function solely of gas mass flow rate $\dot{m}$. The exponential term of equation (2) is assumed to be an empirical function solely of gas mass flow rate $\dot{m}$. Equation (2) is manipulated into a temperature ratio Tr to facilitate its implementation in this embodiment as follows:

$$Tr = \frac{(To - Tw)}{(Ti - Tw)} = e^{-\left(\frac{\pi DL}{\dot{m} \cdot cp}\bar{h}\right)} \cong f_a(\dot{m}) \tag{3}$$

in which $f_a()$ is an empirical lookup function for dimensionless temperature ratio Tr. The final implementation form for modeling To as a function of gas mass flow rate $\dot{m}$ and Ti is expressed as:

$$To=Tr(Ti-Tw)+Tw=f_a(\dot{m})\cdot(Ti-Tw)+Tw \tag{4}$$

Equation (4) will subsequently be applied for modeling gas temperature change across each element of a generic engine system, such as engine system 10 of FIG. 1, that is characterized through the thermal state model of this embodiment as a heat exchanger tube element, such as tube element 200 of FIG. 2.

Figure 3:
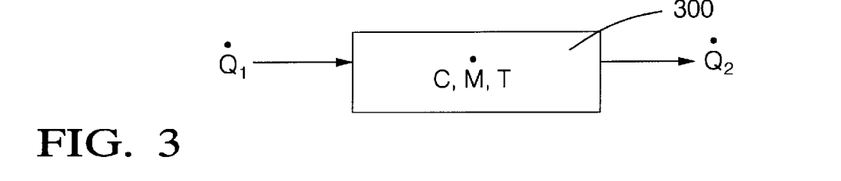
FIG. 3 is a schematic diagram of a thermal capacitance element for modeling temperature dynamics of the engine system of FIG. 1.

Referring to FIG. 3, a thermal capacitance element is generally illustrated for modeling the transient effect of heat energy stored in a mass 300, such as an intake manifold 16 (FIG. 1), cylinder head 14 (FIG. 1), or the exhaust manifold 64 including the downpipe (FIG. 1), in a manner analogized to storage of charge in a capacitive electrical circuit element. Thermal capacitance is a parameter relating the net heat flow into a mass to the rate of change of temperature of the mass.

The thermal capacitance element 300 (FIG. 3) is assumed to be a fixed mass element which, at any instant contains a net amount of energy and which has one heat flow inlet and one heat flow outlet. Applying conservation of energy principles to the mass of the element 300, which may be expressed as $$\dot{Q}_1 - \dot{Q}_2 - CM \cdot \frac{dT}{dt} = 0, \tag{5}$$

in which M is the mass of the element 300, C is the specific heat of the element 300, T is the average lump temperature of the element 300, t is time, $\dot{Q}_1$ is the incoming heat flow into the element 300, and $\dot{Q}_2$ is the outgoing heat flow out of the element 300, the temperature of the element 300 may be determined by summing all heat flows into the element 300 into a net incoming heat flow, and solving equation (5) for T through an integration process.

A temperature source element model is generated to account for the cylinder combustion chamber 44 acting as a heat source within the reticulated engine system 10 of FIG. 1. Engine gross power level was assumed to be a primary setting which affects the average combustion cycle temperature within the combustion chamber 44. The ignition timing setting, percent dilution and air/fuel ratio of the air-fuel mixture entering the cylinder combustion chamber 44 for combustion therein were assumed to be secondary effects and neglected for the present thermal modeling. The inventors have established that the engine heat release and the corresponding average combustion chamber temperature is primarily a function of fuel energy release and combustion chamber wall heat transfer.

Heat release is related to fresh air mass flow and engine speed through a first order approximation at a given ignition timing and exhaust gas recirculation rate, as fuel input is proportional to fresh airflow and thermal efficiency is related to engine intake mass airflow rate and engine speed. Heat transfer within a cylinder combustion chamber 44 (FIG. 1) is related to total intake port 48 (FIG. 1) flow and engine speed as the combustion chamber convection coefficient is a function of the applicable Nusselt number, which is generally understood by those possessing ordinary skill in the art to which this invention pertains. The Nusselt number is known to be affected by gas flow rate through the combustion chamber and by the effect of varying engine speed on combustion chamber flow characteristics. It is also affected less significantly by change in gas viscosity, temperature, and pressure, however, these secondary influences are neglected in the current model.

A relatively simple model relating the average combustion chamber 44 (FIG. 1) temperature from exhaust valve open to exhaust valve closed to cylinder combustion chamber gas mass flow rate and engine speed is provided in this embodiment, as follows:

$$T_{avg}=f_b(RPM, \dot{m}_{air}) \tag{6}$$

in which $\dot{m}_{air}$ is fresh air mass flow rate into the engine system 10 (FIG. 1), $T_{avg}$ is average combustion chamber temperature from combustion chamber exhaust valve opening to exhaust valve closing, and $f_b()$ is a conventional lookup table developed through a conventional simulation procedure applying generally-known heat-release equations.

Figure 4:
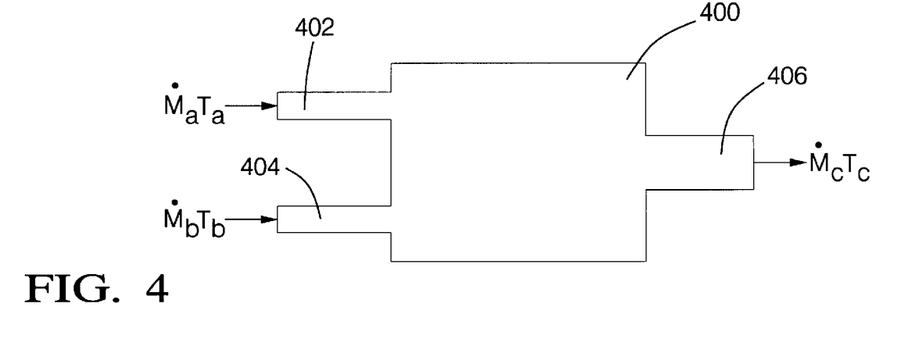
FIG. 4 is a schematic diagram of an energy conservation element for modeling thermal mixing processes of the engine system of FIG. 1.

Referring to FIG. 4, an element is included in the present model to model the temperature of a mixture of two or more ideal gases which enter a mixing element 400 at different temperatures and mass flow rates. A first gas at a first temperature $T_a$ and a first mass flow rate $\dot{m}_a$ enters the mixing element 400 along a first entry path 402 and a second gas at a second temperature $T_b$ and a second mass flow rate $\dot{m}_b$ enters the mixing element 400 along a second entry path 404, and the resulting gas mixture having a temperature $T_c$ and a mass flow rate $\dot{m}_c$ exits the mixing element 400 along an exit path 406. The mixing element 400 is assumed in this embodiment to allow no heat transfer or work input through its boundaries and to be incapable of storing flow during transient conditions. Under steady state conditions, the outlet temperature $T_c$ can be determined from the incoming gas flow rates and temperatures through application of the First Law of Thermodynamics (Conservation of Energy) as follows:

$$\dot{m}_a \cdot cp \cdot T_a + \dot{m}_b cp \cdot T_b + \dot{m}_c \cdot cp \cdot T_c = 0 \quad (7)$$

Applying conservation of mass principles to the mixing element 400, expressed as $$\dot{m}_a + \dot{m}_b - \dot{m}_c = 0 \quad (8)$$

T3 may be expressed as a function of the other variables in equations (7) and (8) as follows:

$$T_c = \frac{\dot{m}_a}{\dot{m}_a + \dot{m}_b} \cdot T_a + \frac{\dot{m}_b}{\dot{m}_a + \dot{m}_b} \cdot T_b \quad (9)$$

Figure 5:
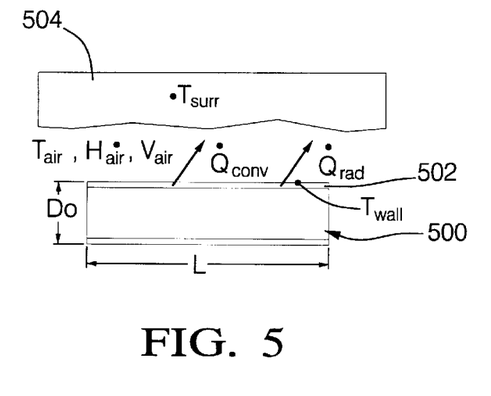
FIG. 5 is a schematic diagram of an element having significant radiation and convection heat transfer processes for modeling thermal processes of the engine system of FIG. 1.

Referring to FIG. 5, relevant external radiation heat transfer processes are modeled through a structure of a tube 500 of length L and diameter $D_o$ which radiates heat to its surroundings from its outside surface 502 as follows:

$$Q_{rad} = 0.25 \pi D_o \sigma \epsilon F_v (T_{wall}^4 - T_{surr}^4) \quad (10)$$

in which $Q_{rad}$ is the radiation heat transfer rate from the outside wall of the tube 500 to its surroundings, $T_{wall}$ is the outside wall 502 temperature of the tube 500, $T_{surr}$ is the temperature of a surface 504 in the surroundings of the tube, $\sigma$ is the Boltzman constant, $\epsilon$ is the emissivity for the tube material and the heat transfer medium, and $F_v$ is the view factor for the tube 500 surface and surroundings surface 504.

The Boltzman constant $\sigma$ is the radiation heat transfer coefficient for an ideal radiator (black body). The emissivity $\epsilon$ accounts for the effects of tube 500 surface, tube 500 material, and heat transfer medium on the heat transfer rate. Standard empirically determined values are available for such constant in commercially available heat transfer references. The view factor $F_v$ accounts for the effects of the geometric orientation and attributes of the radiation emitting tube 500 surface relative to the surrounding surface 504 properties. A view factor of one is used in this embodiment and should only be departed from and an empirically-determined value used when considerable errors are encountered in the radiation heat transfer model. The radiation heat transfer equation (10) is implemented by applying a measured or modeled tube outer surface temperature and a surroundings temperature value to an analytical radiation heat transfer table which may be stored in the form of a standard lookup table in a non-volatile memory device, with a radiation heat transfer rate referenced from the table as a function of the temperature inputs. The lookup table is applied in this embodiment due to the computational (throughout) burden associated with the fourth order term of equation (10).

Referring to FIG. 5, relevant convection heat transfer between the outside surface 502 of the tube 500 and a surrounding fluid, such as air is provided using Newton's Law of Cooling, as follows:

$$\dot{Q}_{conv} = \pi D_o L h_{air}(T_{wall} - T_{air}) \quad (11)$$

in which $Q_{conv}$ is the convection heat transfer rate from the tube 500 to the surrounding fluid, $h_{air}$ is the convection coefficient of the fluid flowing around the outside of the tube 500, and $T_{air}$ is the temperature of the fluid surrounding the tube 500.

The convection coefficient $h_{air}$ can be expressed as a function of tube diameter $D_o$, the generally understood Reynolds number, gas conductivity, and generally understood Prandtl number for both turbulent and laminar flow. The flow direction of the fluid surrounding the tube 500 affects the empirically determined convection coefficient $h_{air}$. The present model was simplified by assuming that changes in Prandtl number, pipe diameter, air viscosity, air density, and air conductivity are negligible. Accordingly, equation (11) is re-written as:

$$\dot{Q}_{conv} = f3(V_{air})(T_{wall} - T_{air}) \quad (12)$$

in which $f3()$ is a lookup table function describing a calibrated relationship between air velocity to a convection heat transfer coefficient, and Vair is the axial velocity of the fluid, such as air, surrounding the tube 500 relative to the tube 500.

Figure 6:
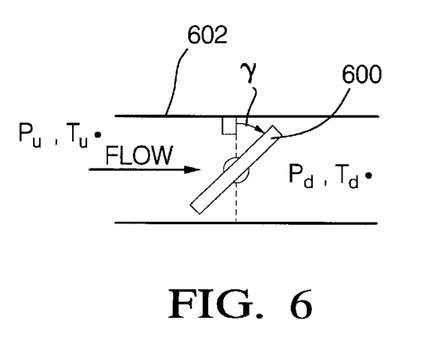
FIG. 6 is a schematic diagram of a thermodynamic throttling element for modeling thermal processes of the engine system of FIG. 1.

Referring to FIG. 6, the thermal effect of passage of a gas across a throttling element 600 offset by an angle from a perpendicular (no flow) position within a passage 602, in an isentropic process is modeled in this embodiment using the ideal gas relation:

$$\frac{T_d}{T_u} = \frac{P_d}{P_u}^{(\gamma-1)/\gamma} \quad (13)$$

in which Td is gas temperature downstream of the throttling element 600 (in the normal direction of flow the gas as indicated in FIG. 6), $T_u$ is the gas temperature upstream of the throttling element 600, $P_d$ is the downstream gas pressure, Pu is the upstream gas pressure, and $\gamma$ is the specific heat ratio of the gas flowing by the throttling element 600.

Figure 7:
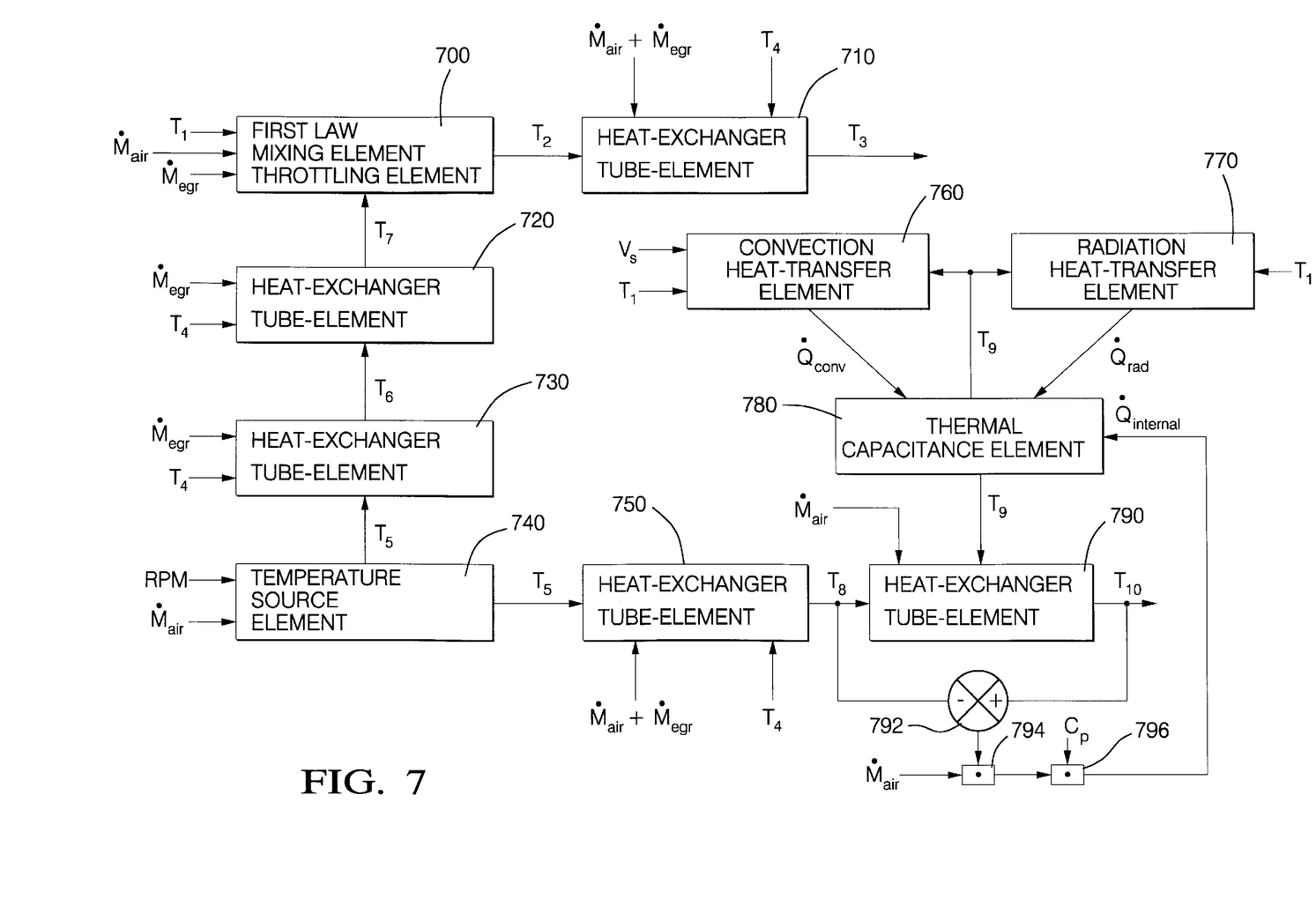
FIG. 7 is a block diagram illustrating thermal state modeling of the thermal processes of the engine system of FIG. 1.

Assuming the friction work done by the gas as its flows past the throttling element 600 is primarily a function of the mass flow rate past the throttling element 600 and of geometry of the opening between the throttling element 600 and the passage 602 and that mass flow rate is primarily a function of pressure ratio across the throttling element 600, equation (13) is modified as follows:

$$\frac{T_d}{T_u} = f4\left(\alpha \cdot \frac{P_d}{P_u}\right) \quad (14)$$

in which $f_4$ is a temperature ratio lookup table including calibrated temperature ratio entries that are referenced as a finction of $\alpha$, $P_d$ and $P_u$, Referring to FIG. 7, a block diagram illustration of an application of the above-described flow element models in a model of the engine system of FIG. 1 in accord with this embodiment. Block 700, a combination of the mixing element and throttling element is provided to generate temperature $T_2$ at temperature node N2 (FIG. 1) which is downstream from the second end 72 of conduit 68, from inputs of temperature $T_1$, $T_7$, $\dot{M}_{air}$ and $\dot{M}_{egr}$. Block 700 models thermal effects of mixing of recirculated exhaust gas exiting the conduit 68 at the second end 72 at flow rate $\dot{M}_{egr}$ and at temperature $T_7$ (at node 7 of FIG. 1) with inlet air passing across throttling element 32 at mass flow rate $\dot{M}_{air}$ with an initial temperature $T_1$ (at node N1 of FIG. 1), as follows:

$$T_2 = \left(\frac{\dot{M}_{air}}{\dot{M}_{air}+\dot{M}_{egr}}\right) f_4\left(\alpha, \frac{MAP}{BARO}\right) T_1 + \left(\frac{\dot{M}_{egr}}{\dot{M}_{air}+\dot{M}_{egr}}\right) \quad (15)$$

in accordance with the above equations 9 and 14, and in which f4() is a calibrated lookup table as described above for equation 14 which is stored in a standard non-volatile memory device, such as the ROM device 104 (FIG. 1).

Returning to FIG. 7, the generated temperature T2 is applied to heat exchanger tube element 710 applied to model the change in temperate of the mixture of inlet air and recirculated exhaust gas as it passes through the passage 18 in intake manifold 16. T4, $\dot{M}_{air}$ and $\dot{M}_{egr}$ are further applied as inputs to element 710 from which temperature T3 at node N3 (FIG. 1) is generated, representing the temperature of gasses exiting the passage 18 and entering cylinder intake runners, such as runner 42 of FIG. 1, as follows:

$$T_3 = T_4 - f_3(\dot{M}_{air} + \dot{M}_{egr})(T_4 - T_2) \quad (16)$$

in accordance with the above-described model implemented as equation 4, and in which $f_3()$ is a calibrated lookup table as described above for equation 4 and which may be stored in a standard non-volatile memory device, such as a ROM device.

Referring again to FIG. 7, temperature source element 740 models the heat transfer processes of combustion chambers of the engine system cylinders, such as combustion chamber 44 of cylinder 38 of FIG. 1 and receives as inputs engine speed, indicated as signal RPM and $\dot{M}_{air}$. The source element outputs temperature value T5, representing the temperature at node N5 within the combustion chamber 44, as illustrated in FIG. 1, as follows:

$$T_5 = f_5(RPM, \dot{M}_{air}) \quad (17)$$

in accordance with the above-described model implemented as equation 6, in which $f_5()$ is a calibrated lookup table stored in a standard non-volatile memory device, such as the ROM device 104 (FIG. 1).

The generated temperature $T_5$ is applied as an input to other models of the thermal engine system model of this embodiment, including heat exchanger tube element model 730 for generating temperature T6 at node N6 (FIG. 1) representing the temperature of recirculated engine exhaust gas at an intermediate position within the EGR conduit 68 (FIG. 1). Inputs $\dot{M}_{egr}$ and temperature $T_4$, a measured quantity in this embodiment from the output signals of temperature sensor 116 of FIG. 1 are further applied to the model 730, as follows:

$$T_6 = T_4 - f_6(\dot{M}_{egr})\cdot(T_4 - T_5) \quad (18)$$

in accordance with the above-described heat exchanger tube element model implemented as equation 5 in which $f_6()$ is a calibrated lookup table corresponding to that described for equation 4 above and stored in a standard non-volatile memory device, such as the ROM device 104 (FIG. 1). The generated temperature T6 is applied to heat exchanger tube element model 720 of FIG. 7 for modeling the temperature $T_7$ at node N7 of FIG. 1. Inputs $\dot{M}_{egr}$ and temperature $T_4$ at node N4 are further applied to the model 720 as follows:

$$T_7 = T_4 - f_7(\dot{M}_{egr})\cdot(T_4 - T_6) \quad (19)$$

in accordance with the above-described model developed for the heat exchanger tube element 200 of FIG. 2 and implemented as equation 4, and in which f7() is a calibrated lookup table as described for the model of FIG. 2 and which is stored in a standard non-volatile memory device, such as the ROM device 104 (FIG. 1).

Returning to FIG. 7, the modeled temperature T5 of the combustion chamber such a combustion chamber 44 of FIG. 1, is further applied to the heat exchanger tube element model 750 to generate temperature T8 at node N8 of FIG. 1, representing the temperature of gasses passing through the exhaust runner 74. The model further receives inputs of temperature $T_4$, $\dot{M}_{air}$, and $\dot{M}_{egr}$ and applies the inputs as follows:

$$T_8 = T_4 - f_8(\dot{M}_{egr} + \dot{M}_{air})\cdot(T_4 - T_5) \quad (20)$$

in accordance with the above-described model developed for the heat exchanger tube 200 of FIG. 2 and implemented as equation 4 above, in which f8() is a calibrated lookup table stored in a standard non-volatile memory device, such as the ROM device 104 (FIG. 1). The temperature T8 is applied to heat exchanger tube element 790 to generate temperature T10 at node N10, which is the temperature of engine exhaust gas passing out of the passage 62 of FIG. 1 to a catalytic treatment device (not shown). Temperature T9, and $\dot{M}_{air}$ are further applied to the model 790, whereat $T_{10}$ is generated as follows:

$$T_{10} = T_9 - f_{10}(\dot{M}_{air})(T_9 - T_8) \quad (21)$$

in accordance with the above-described model developed for the generic tube element 200 of FIG. 2, wherein f10() is a calibrated lookup table stored in a standard non-volatile memory device, such as the ROM device 104 (FIG. 1).

The temperature T1, along with measured or estimated vehicle speed Vs and modeled temperature T9 are applied to convection heat transfer element 760 to model the convection heat transfer $Q_{conv}$ from the exhaust manifold 64 of FIG. 1 to surrounding air through application of the convection heat transfer model of FIG. 5. $Q_{conv}$ is then applied, as illustrated in FIG. 7, to a thermal capacitance element 780 for estimating temperature T9. Additionally, temperatures T1 and T9 are applied to radiation heat transfer element model 770 to model the radiation heat transfer $Q_{rad}$ from the exhaust manifold 64 of FIG. 1 to surrounding air through application of the radiation heat transfer model of FIG. 5. $Q_{rad}$ is then applied, as illustrated in FIG. 7, to the thermal capacitance element 780 for estimating temperature T9. $\dot{M}_{air}$ is applied to multiplication node 794, to be multiplied by a difference between T10 and T8 as generated at summing node 792, to form a product multiplied by a referenced specific heat Cp of the gas passing through the exhaust manifold 64 (FIG. 1) at multiplication node 796 having an output applied to the thermal capacitance element 780 to generate T9. These processes, resulting in an estimate of temperature T9 of the exhaust manifold 64 (and downpipe material), are lumped together in the following equation for brevity:

$$T_9 = \frac{1}{Cpipe \cdot Mpipe} \int \{ (\dot{M}_{air} + \dot{M}_{egr}) cp(T_{10} - T_8) - \qquad (22)$$

$$f_c(Vs)(T_9 - T_1) - f_r(T_9, T_1) \}$$

in accordance with the convection and radiation heat transfer models of FIG. 5 and of equations 10 and 12, the thermal capacitance element model of FIG. 3 and of equation 5, and the heat exchanger tube element model of FIG. 2 and of equation 4, in which $f_c()$ and $f_r()$ are calibrated lookup tables stored in a standard non-volatile memory device such as the ROM device 104 (FIG. 1), Vs is vehicle speed, $C_{pipe}$ is a measured specific heat of the downpipe included in exhaust manifold 64 (FIG. 1) and $M_{pipe}$ is a measured mass of the downpipe.

Figures 8, 9:
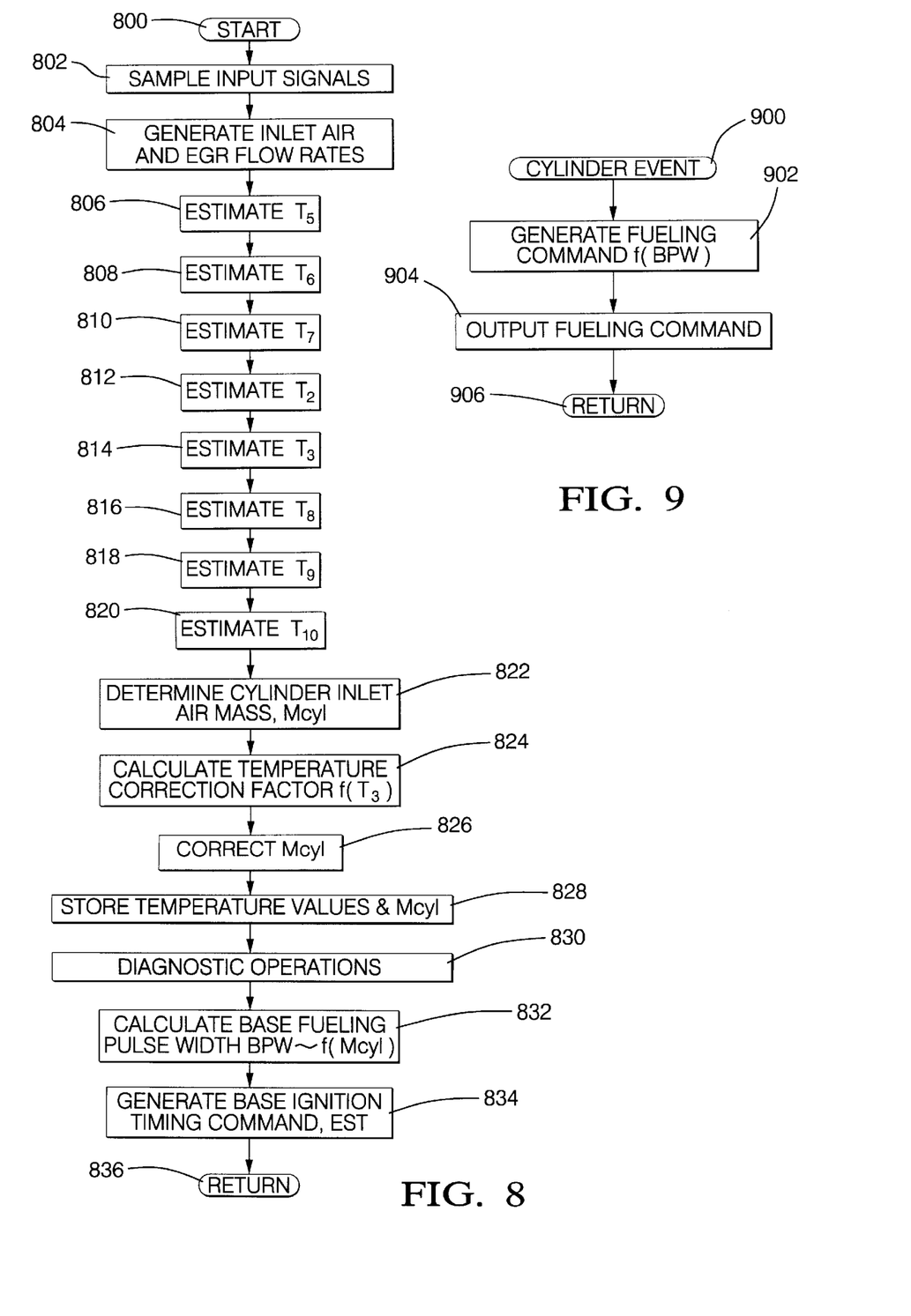
FIGS. 8–9 are computer flow diagrams illustrating a flow of operations for carrying out thermal modeling of the engine system of claim 1 for application in engine system control and diagnostics.

Referring to FIGS. 8 and 9, flow diagrams illustrate a flow of control and diagnostic operations for modeling temperature at the temperature nodes N0–N10 of FIG. 1 and applying the modeled temperature in engine control and diagnostics in accordance with this embodiment. The operations are implemented as a sequence of software instructions stored in the ROM device 104 of FIG. 1 that are executed periodically while the controller is activated (such as through manual application of ignition power to the controller 100 of FIG. 1). More specifically, the operations of FIG. 8 may be carried out on a timed interval, such as about every one hundred milliseconds while the controller is activated, beginning at a step 800 and proceeding to sample input signals from various transducers at a next step 802, including the described input signals $T_1$, MAP, RPM, Vs, $T_3$, $T_4$, and Tp.

Engine inlet air and recirculated exhaust gas EGR mass flow rates are next estimated at a step 804, for example in the manner described in the copending U.S. patent application Ser. No. 08/759,276, incorporated herein by reference and as also described in the copending U.S. patent application Ser. No. 08/759277, also incorporated herein by reference. The next steps 806–820 apply the models of FIG. 7 in a series of interdependent temperature estimation processes at the temperature nodes N2–N10 of FIG. 1. Temperature T5 is estimated through application of equation 17 above at a first step 806, then temperature T6 is estimated through application of equation 18 above at a next step 808, then temperature T7 is estimated through application of equation 19 above at a next step 810, then temperature T2 is estimated through application of equation 15 above at a next step 812, then temperature T3 is estimated through application of equation 16 above at a next step 814, then temperature T8 is estimated through application of equation 20 above at a next step 816, then temperature T9 is estimated through application of equation 22 above at a next step 818, then temperature T10 is estimated through application of equation 21 above at a fmal step 820.

Cylinder inlet air mass Mcyl is next determined at a step 822 through application of the modeling processes described in the incorporated references, and a correction factor is then determined at a step 824 to account for cylinder intake runner 42 (FIG. 1) air density variation with temperature as a function of the estimated air temperature T3 at node N3. For example, a standard lookup table stored in non-volatile memory, such as the ROM device 104 of FIG. 1 may be generated through conventional calibration procedures to determine air density variation with temperature T3 variation, and correction factors retrieved therefrom at the step 824 as a function of the estimated temperature T3. The correction factor is next applied to Mcyl to correct Mcyl for temperature effects in the intake runner 42 (FIG. 1) at a next step 826 and the corrected Mcyl as well as the estimated temperature values are then stored in a standard memory device of controller 100 of FIG. 1 at a next step 828.

Diagnostic operations may then be carried out as represented by step 830, which may include overtemperature diagnostic operations dependent on the estimated temperatures T2–T10 generated through the operations of FIG. 8 which, for example, compare the estimated temperatures to calibrated temperature threshold values to identify persistent overtemperature conditions which may indicate a fault condition in the engine system 10, which may be indicated to the engine operator to facilitate treatment or other corrective action through a standard indicator device, such as a lamp or an audible alert mechanism (not shown).

A base fueling pulse width BPW is next determined and stored for later use at a step 832 through standard fueling control operations which, for example, attempt to maintain a desired air/fuel ratio of the charge admitted to the combustion chamber 44 (FIG. 1) during a cylinder intake event, such as the stoichiometric ratio, by adjusting the fuel mass injected to the runner 42 (or directly into the cylinder in known direct injection applications) in correct proportion to the estimated flow rate of air passing to the cylinder. A base ignition timing command EST is next determined and stored for use at a step 834 in accordance with the engine system 10 (FIG. 1) operation condition, including the modeled engine system temperature condition. An ignition drive signal will be issued by the controller 100 (FIG. 1) to the ignition control module (108) at a timing dictated by the command EST, as is generally understood in the art, for timed actuation of cylinder spark plugs, such as spark plug 46 of FIG. 1. Following determination and storage of EST, the operations of FIG. 8 conclude by returning, via a next step 836, to resume execution of any controller operations that were temporarily suspended to allow for execution of the operations of FIG. 8, such as generally understood controller background operations. The operations of FIG. 8 will recur, beginning at the step 800, after a specific time interval, as described.

Referring to FIG. 9, fueling control operations are generally illustrated for generating and issuing a fueling command FUEL to the fuel control module 109 of FIG. 9 following each successive engine cylinder event, such as an engine cylinder top dead center event. Upon detecting such an engine cylinder event, the operations of FIG. 9, which may include further control operations as is generally understood in the art, are initiated at a step 900 and proceed to generate a fueling command as a function of BPW at a step 902. The fueling command may include any necessary corrections to BPW to account for transient engine operating conditions, as is generally understood in the art. The fueling command is then output as command signal FUEL to the fuel control module 109 of FIG. 1 at a next step 904 so that a fuel injection command may be issued to a next active fuel injector to administer fuel to an intake runner for a next active engine cylinder. The operations then conclude by returning, via a next step 906, to any prior operations, such as controller background operations, that were temporarily suspended to allow for execution of the operations of FIG. 9, in accord with generally known interrupt-driven processing procedures.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. A method for estimating temperature in an internal combustion engine system, comprising the steps of:
   reticulating the engine system into a network of thermally interdependent temperature nodes;
   identifying, for at least one of the temperature nodes, all significant heat transfer branches into and out of the node;
   modeling heat transfer at the identified heat transfer branches; and
   estimating temperature at the at least one heat transfer node as a function of the modeled heat transfer at the identified heat transfer branches.

2. The method of claim 1, further comprising the step of:
   controlling engine operation in accordance with the estimated temperature.

3. The method of claim 1, further comprising the steps of:
   comparing the estimated temperature to a temperature limit; and
   diagnosing an overtemperature fault condition when the estimated temperature exceeds the temperature limit.

4. The method of claim 1, wherein the engine system includes an intake runner for guiding gasses to at least one engine cylinder, and wherein the at least one temperature node includes a temperature node in the intake runner, the method further comprising the steps of:
   generating a cylinder mass airflow rate estimate;
   determining an air density correction value as a function of the estimated temperature at the temperature node in the intake runner;
   applying the air density correction value to the cylinder mass airflow rate estimate to form a corrected estimate;
   determining a cylinder fueling requirement as a function of the corrected estimate to provide a desired cylinder air/fuel ratio; and
   controlling delivery of fuel to a cylinder in accordance with the determined cylinder fueling requirement.

5. The method of claim 1, further comprising the steps of:
   identifying additional temperature nodes having a thermal state on which the identified heat transfer branches are dependent;
   identifying, for each of such additional temperature nodes, all significant additional heat transfer branches that transfer significant heat into or out of the node;
   modeling heat transfer at the additional heat transfer branches; and
   estimating temperature at the additional temperature nodes as a function of the modeled heat transfer at the additional heat transfer branches;
   and wherein the step of modeling the heat transfer at the identified heat transfer branches models the heat transfer as a function of the estimated temperature at the additional temperature nodes.

6. A thermal state estimation method for internal combustion engine system control, comprising the steps of:
   representing an engine system as a network of thermally coupled temperature nodes;
   establishing a temperature node at which accurate temperature estimation is required for engine control;
   identifying heat transfer processes that significantly affect the temperature at the established temperature node;
   identifying all additional temperature nodes with temperatures on which any of the identified heat transfer processes are substantially dependent;
   identifying additional heat transfer processes that significantly affect the temperature at the additional temperature nodes;
   modeling the heat transfer rate of the additional heat transfer processes;
   estimating temperature at the additional temperature nodes as a function of the modeled heat transfer rate of the additional heat transfer processes;
   modeling the heat transfer rate of the heat transfer processes that significantly affect the temperature at the established temperature node;
   estimating temperature at the established temperature node as a function of the modeled heat transfer rate of the heat transfer processes that significantly affect the temperature at the established temperature node; and
   controlling engine operation in accordance with the estimated temperature at the established temperature node.

7. The method of claim 6, wherein the engine system includes a cylinder inlet passage through which gasses enter an engine cylinder, and wherein the established temperature node is positioned within the cylinder inlet passage.

8. The method of claim 7, wherein the controlling step further comprises the steps of:
   estimating cylinder inlet air rate;
   calculating an air density correction factor as a function of the estimated temperature at the established temperature node;
   correcting the cylinder inlet air rate estimate by applying the air density correction factor thereto;
   providing a desired cylinder air/fuel ratio;
   calculating a cylinder fueling requirement as a function of the corrected cylinder inlet air rate estimate and the desired cylinder air/fuel ratio; and
   controlling cylinder fueling in accordance with the cylinder fueling requirement.

9. A thermal state estimation method for internal combustion engine system diagnostics, comprising the steps of:
   representing a complete engine system as a network of thermally interdependent temperature nodes;
   establishing a temperature node at which accurate temperature estimation is required for engine diagnostics;
   identifying heat transfer processes that significantly affect the temperature at the established temperature node;
   identifying all additional temperature nodes with temperatures on which any of the identified heat transfer processes are substantially dependent;
   identifying additional heat transfer processes that significantly affect the temperature at the additional temperature nodes;
   modeling the heat transfer rate of the additional heat transfer processes;

estimating temperature at the additional temperature nodes as a function of the modeled heat transfer rate of the additional heat transfer processes;

modeling the heat transfer rate of the heat transfer processes that significantly affect the temperature at the established temperature node;

estimating temperature at the established temperature node as a finction of the modeled heat transfer rate of the heat transfer processes that significantly affect the temperature at the established temperature node;

providing a temperature range for the established temperature node associated with normal engine system operation;

comparing the estimated temperature to the provided temperature range; and diagnosing a fault condition when the estimated temperature is outside the provided temperature range.

* * * * *